US010746566B2

(12) United States Patent
Drachmann (10) Patent No.: US 10,746,566 B2
(45) Date of Patent: Aug. 18, 2020

(54) RADIO PROTOCOL FOR COMMUNICATION WITH METER DEVICES (71) Applicant: APATOR MIITORS ApS, Horsens (DK)

(72) Inventor: Jens Drachmann, Viby J (DK)

(73) Assignee: Apator Militors ApS, Aarhus V (DK)

( * ) Notice: Subject to any disclaimer, the term of this patent is extended or adjusted under 35 U.S.C. 154(b) by 0 days.

(21) Appl. No.: 14/348,793

(22) PCT Filed: Sep. 28, 2012

(86) PCT No.: PCT/DK2012/050365
§ 371 (c)(1),
(2) Date: Mar. 31, 2014

(87) PCT Pub. No.: WO2013/050037
PCT Pub. Date: Apr. 11, 2013

(65) Prior Publication Data
US 2014/0285358 A1 Sep. 25, 2014

(30) Foreign Application Priority Data

Oct. 3, 2011 (DK) .................................. 2011 00759

(51) Int. Cl.
G01D 4/00 (2006.01)
H04L 29/08 (2006.01)
(Continued)

(52) U.S. Cl.
CPC ............. *G01D 4/002* (2013.01); *H04L 67/12* (2013.01); *H04L 69/04* (2013.01); *H04W 4/38* (2018.02)

(58) Field of Classification Search
CPC .......... G01D 4/002; H04L 67/12; H04L 69/04
See application file for complete search history.

(56) References Cited

U.S. PATENT DOCUMENTS 6,100,817 A * 8/2000 Mason, Jr. ............. G01D 4/004
340/870.02
7,012,546 B1 * 3/2006 Zigdon .................. H04B 1/707
340/870.01
(Continued)

FOREIGN PATENT DOCUMENTS

EP 1263167 A1 12/2002
EP 1594284 A2 11/2005
(Continued)

OTHER PUBLICATIONS

Danish Patent and Trademark Office Search Report Application No. PA 2011 00759 Completed: May 15, 2012 2 pages.
(Continued)

*Primary Examiner* — James J Yang
(74) *Attorney, Agent, or Firm* — Lee & Hayes, P.C.

(57) ABSTRACT

A method for communication between a meter device and a communication network in accordance with a radio protocol, the meter device including a meter device identification and the radio protocol including a reduced part of the meter device identification and a data field, wherein the method of communication involves transmitting a data telegram according to the protocol from the meter device, receiving the data telegram by the communication network, and identifying the meter device from a set of identification elements, including the reduced part of the meter device identification and at least one information element obtained from a data source external to the meter device. The invention furthermore relates to an identification computer device and a meter device adapted for operating according to the above mentioned radio protocol, and a radio protocol for communication between a meter device and a communication network in accordance with the above mentioned radio protocol.

13 Claims, 6 Drawing Sheets (51) Int. Cl.
*H04L 29/06* (2006.01)
*H04W 4/38* (2018.01)

(56) References Cited

U.S. PATENT DOCUMENTS

| | | | | |
|---|---|---|---|---|
| 2003/0048199 | A1* | 3/2003 | Zigdon | H04B 1/707 340/870.02 |
| 2003/0097482 | A1* | 5/2003 | DeHart | H04L 29/06 709/253 |
| 2008/0186137 | A1* | 8/2008 | Butler | G06K 19/0723 340/10.1 |
| 2009/0102681 | A1 | 4/2009 | Brennan, Jr. et al. | |
| 2011/0188656 | A1* | 8/2011 | McCullough | H04L 9/14 380/259 |

FOREIGN PATENT DOCUMENTS

| | | | |
|---|---|---|---|
| EP | 2088706 | A2 | 8/2009 |
| GB | 2290399 | A | 12/1995 |

OTHER PUBLICATIONS

International Search Report Application No. PCT/DK2012/050365 Completed: Dec. 11, 2012; dated Dec. 19, 2012, 3 pages.

\* cited by examiner

RADIO PROTOCOL FOR COMMUNICATION WITH METER DEVICES

The present invention relates to a radio protocol for communication between a meter device and a communication network, a meter device and a communication network for communicating according to the radio protocol, and a method communication according to the radio protocol.

BACKGROUND

The invention is suitable for a remotely readable meter device, such as a meter device that measures the consumption of a q such as electricity, gas, heat, water, etc. and reports measurements to a central system via a communication network. Such meter devices may e.g. transmit data about the consumption or status of the meter device via the network at regular intervals or when receiving an initiating signal. The collection of data from the meter device may be done by a stationary network such as stationary antennas or by a mobile network comprising means for receiving data and means for storing or for transmitting data further, e.g. to a main location of the utility network system.

The power source of remotely readable meter devices may be a battery, at least for commutating data. As one of the advantages of remotely readable meter devices is that they do not require on the spot service but can be read out remotely, it is important that such batteries have a sufficiently long lifetime, and therefore do not require service in the form of an unnecessary battery change.

When a remotely readable meter device is communicating with a network by sending a data telegram according to a certain communication protocol, there are certain requirements to the communication protocol, i.e. to the contents of the data telegram. Such requirements may comprise at least establishment of synchronization between the sender and the receiver, identification of the meter, a checksum value for verification of the sent data, and a data field, which contains information about the consumption, operation, or status relating to the meter device. Furthermore, the protocol will usually contain more information, such as timing information, information about the length of the data telegram, information about the formatting of the data of the data field, information about the data fields, such as information about which quantity is measured, the unit it is measured in etc. The ratio between the actual information about the consumption, operation, or status, such as number and/or status bytes, and information that either does not relate directly to consumption, operation, or status, such as information about timing or information about measuring units, may be rather low. I.e. the numbers telling about the consumption, operation, or status may constitute a rather small amount of data compared to the full data telegram.

It is known from EP 2088706 that when a meter device communicates a consumed quantity to a utility system by means of an MBUS data string including an identification of the meter, data record headers may be omitted. By using a checksum calculated over the full MBUS string including the data headers and including this checksum in the communication, the validity of the data record header assumed by the utility system may be tested.

BRIEF DESCRIPTION OF THE INVENTION

The invention relates to a radio protocol for communicating data between a meter device and a communication network, said meter device being provided with a meter device identification for identifying said meter device, in which said radio protocol comprises:
a reduced part of said meter device identification and
a data field, and
in which a full meter device identification of said meter device can be determined on the basis of a set of identification elements, said set of identification elements comprising at least:
said reduced part of said meter device identification, and
at least one information element obtained from a data source external to said meter device.

According to the above embodiment of the invention, the identification part of the radio protocol includes only a reduced part of the meter device identification. By excluding a part of the meter device identification, the data telegram sent from the meter device to the communication network according to the above embodiment will be shorter compared to a data telegram containing a full meter device identification. A shorter data telegram requires less energy to send. Therefore, for battery powered meter devices this shortening of the data telegram will increase the battery lifetime. This applies both to meter devices that are powered only by one or more batteries, but also to meter devices where at least the transmitting function is battery powered. An increased battery life is highly advantageous as it makes the need for battery changes less frequent or even completely unnecessary. Also, by keeping the data telegram as short as possible with respect to other elements, the battery lifetime is increased. However, when a data telegram is received by the communication network, it still needs to be identified. This identification cannot take place solely on the basis of the reduced part of the meter device identification as more than one meter device may have matching reduced parts of their meter device identifications. Therefore, also at least one identification element obtained from a data source external to said meter device is used in the identification process together with the reduced part of the meter device identification.

A meter device identification is generally to be understood as a piece of information that uniquely identifies the meter device. The meter device identification could e.g. be an identification number, but may also be understood as a sequence of characters such as numbers, letters or other symbols. Numbers are to be understood as any kind of number regardless of representations or bases such as 10-digit Arabic numbers, hexadecimals, binary numbers, bit sequences, or other numbers.

According to an embodiment of the invention, said radio protocol furthermore comprises at least one information element,
said set of identification elements furthermore comprises said at least one information element of the radio protocol, and
said at least one information element obtained from a data source external to said meter device comprises at least information relating to said at least one information element of the radio protocol.

An advantage of this embodiment may be that by including information elements comprised in the radio protocol, i.e. comprised in the data telegram that is sent from the meter device to the communication network, and information relating to this coming from the data source external to the meter device in the set of identification elements that provides the basis for identification, a more certain identification can be carried out. Examples of information elements are given in the below embodiments, however, any information element comprised in the radio protocol, i.e. in the data telegram, may be used to identify the sender meter device. This may in a preferred embodiment be done by comparing with a priori knowledge about such information elements, such as data in a database.

According to an embodiment of the invention, said at least one information element of the radio protocol comprises at least a checksum established on the basis of at least:
  said meter device identification, and
  said data field of the radio protocol.

An advantage of this embodiment may be that by including a checksum value comprised in the radio protocol, i.e. comprised in the data telegram that is sent from the meter device to the communication network in the set of identification elements that provides the basis for identification, a more certain identification can be carried out. There is made no distinction between a checksum and a hash sum as these are considered to be equivalent.

In another embodiment of the invention, the checksum is established on the basis of a reduced part of the meter device identification, said reduced part of the meter device identification containing a part of the meter device identification that is not contained on the radio protocol or the data telegram.

According to an embodiment of the invention, said checksum is a Cyclic Redundancy Check (CRC) sum. According to alternative embodiments, however, this checksum may be other checksums such as Fletcher's checksum, Adler-32 checksum, or a modular checksum.

According to an embodiment of the invention, said at least one information element obtained from a data source external to said meter device comprises at least information about meter device identifications.

An advantage of this embodiment may be that by including information about meter device identifications in the at least one information element obtained from a data source external to said meter, it is possible to have a more certain identification. This could in an embodiment be e.g. by comparing or correlating the reduced part of the meter device identifications of the radio protocol with the above mentioned information about meter device identifications. Thereby, it can be determined which of the meter device identifications that are in agreement with the reduced part of the meter device identification.

According to an embodiment of the invention, the validity of said data field can be determined on the basis of:
  said checksum,
  said data field, and
  said information about meter device identifications.

An advantage of the above mentioned embodiment of the invention may be that it can be determined from the checksum value if there are any errors in the data telegram. I.e. if such errors are present, the checksum value can reveal them. This may e.g. be done by comparing or correlating said checksum calculated on the basis of said data field and said information about meter device identifications. Thereby, it is avoided that wrongful information from a corrupted data telegram is registered. Such wrongful information may for a utility meter device lead to e.g. errors in the consumption of the consumer, which may have negative economic consequences for the consumer and/or the utility company.

According to an embodiment of the invention, the radio protocol comprises a first and a second checksum, said first checksum being established on the basis of at least:
  the full meter device identification
  the data field, said second checksum being established on the basis of the content of the radio protocol. According to this embodiment, the first checksum is particularly suitable for identifying the sender meter device, and the second checksum is particularly suitable for testing the validity of the transmitted data telegram. According to this embodiment, the basis for establishing the first checksum may also comprise timing data such as a time stamp, or other redundant information such as information about the length of the data telegram, information about the data fields, synchronization word, or other header information.

According to an embodiment of the invention, said at least one information element of the radio protocol comprises at least timing data, said timing data being established on the basis of an internal timing function of said meter device, and said at least one information element obtained from a data source external to said meter device comprises information relating to said at least one information element of the radio protocol, said information comprises at least information relating to said internal timing function of said meter device.

An advantage of the above embodiment is that by including timing data comprised in the radio protocol, i.e. comprised in the data telegram that is sent from the meter device to the communication network and information or a priori knowledge about internal timing of meter device, in the set of identification elements that provides the basis for identification, a more certain identification can be carried out.

According to an embodiment of the invention, said at least one information element of the radio protocol comprises at least a synchronization word for synchronizing communication between said meter device and said communication network, and said at least one information element obtained from a data source external to said meter device comprises information relating to said at least one information element of the radio protocol, said information comprises at least information relating to said synchronization word of said meter device.

An advantage of the above embodiment may be that by including a synchronization word comprised in the radio protocol, i.e. comprised in the data telegram that is sent from the meter device to the communication network and information or a priori knowledge about synchronization words of meter device, in the set of identification elements that provides the basis for identification, a more certain identification can be carried out.

According to an embodiment of the invention, said at least one information element obtained from a data source external to said meter device comprises at least information established at least partly on the basis of data fields of previous communication.

An advantage of the above embodiment may be that information about the consumption contained in the data field can be compared with already known information about consumption relating to different meter devices that have previously been received. In an example embodiment, the meter device is a utility meter and measures at least e.g. consumption of water. By comparing a received data field containing a measure of the water consumption with historic data of water consumptions relating to different meter devices, some meter devices can be ruled out. More specifically, meter devices where historic data reveals a water consumption that is greater than the water consumption of the newly received data telegram can be ruled out. This applies for all embodiments where meter devices transmit a cumulative consumption as the consumption may not reverse, i.e. a meter device readout will always be at least the same as the previous readout of the same meter device. In another example embodiment, the meter device measures at least an instantaneous value. To compare with the above example embodiment, this could e.g. be the instantaneous water flow. In an embodiment, such information may also be used to rule out certain meter devices. This could e.g. be if there is a limit, such as a technical limit, to how large the instantaneous water flow can be. Then the instantaneous water flow may be compared with a priori knowledge about maximum instantaneous water flow for possible meter devices. If the received data telegram contains information about an instantaneous water flow larger than the maximum of some meter devices, these meter devices can be ruled out as possible sender meter devices. However, in some embodiments, the consumption level of a meter device may be reset. In such embodiments, information about this reset must be included for the above embodiment to work.

According to an embodiment of the invention, said set of identification elements furthermore comprises at least one communication information element, said at least one communication information element being established at least partly on the basis of said communication between said meter device and said communication network, and said at least one information element obtained from a data source external to said meter device comprises at least information relating to said communication between said meter device and said communication network.

According to an embodiment of the invention, said communication network comprises an antenna for receiving said data telegram, said at least one communication information element comprises at least a location, said location being established at least partly on the basis of the location of said antenna, and said at least one information element obtained from a data source external to said meter device and relating to said communication between said meter device and said communication network, comprises at least information about locations of said meter devices.

An advantage of the above embodiment may be that by including a location of or relating to a receiving antenna and information or a priori knowledge about locations of antennas and/or meter devices in the set of identification elements that provides the basis for identification, a more certain identification can be carried out. In some embodiments, the information or a priori knowledge of locations of antennas and/or meter devices may be requested from a database, and a comparison between the location of the receiving antenna may be made. However, in other embodiments, it may be an advantage that the selection according to the position of the receiving antenna is made by having a local database at the antenna, where this local database contains only information about meter devices from which it may receive data telegrams. Hereby, locational data is taken into account when determining which meter device that has sent the data telegram. If the antenna is mounted on a vehicle or otherwise works as a mobile antenna, i.e. the position of the antenna may vary substantially, a local database may be established by transferring data to a data processing unit in the vehicle where the selection of the transferred data is made on the basis of a planned route of the vehicle.

According to the above embodiment, said at least one information element obtained from a data source external to said meter device relating to said communication between said meter device and said communication network comprises information about locations of meter devices. However, in alternative embodiments, the location of the receiving antenna is determined and compared with known antenna locations e.g. according to a database. This embodiment applies only to stationary antennas as the location of a mobile antenna may not be known a priori. In the broadest embodiment, a location in relation to a receiving antenna is compared to a known location characteristic of the meter device.

According to an embodiment of the invention, the receiving signal strength of the antenna may be used when determining the sender meter device. When receiving a data telegram from a meter device, which is close to the antenna, the signal strength will typically be higher than if the meter device is further away from the antenna. In one embodiment, the signal strength is compared with historical data about signal strengths for different meter devices in order to determine the sender meter device.

According to an embodiment of the invention, said at least one communication information element comprises at least information about a communication channel used for communication between said meter device and said communication network, and said at least one information element obtained from a data source external to said meter device relating to said communication between said meter device and said communication network, comprises at least information about meter device communication channels.

An advantage of this embodiment may be that by including information about a communication channel relating to the transmission from the meter device and information or a priori knowledge about communication channels of meter devices, in the set of identification elements that provide the basis for identification, a more certain identification can be carried out.

According to an embodiment of the invention, said full meter device identification of said meter device can be determined on the basis of said set of identification elements, and said at least one information element obtained from a data source external to said meter device can be compared with at least a part of the rest of said set of identification elements. According to this embodiment, it may be advantageous to obtain said full meter device identifications on the basis of said comparison.

According to an embodiment of the invention, said at least one information element obtained from a data source external to said meter device comprises at least an information list, and said data source external to said meter device is a database.

An advantage of this embodiment may be that by storing a priori knowledge of meter devices in an information list in a database, these are readily available and may be organized and stored in an advantageous way. In some embodiments of the invention, the database may be a central database containing information about all meter devices of the utility company. However, in other embodiments, it may be a local database containing only information about a limited number of meter devices. This local database could in an example embodiment be placed together with a receiving antenna and only contain information about meter devices from which the antenna receives data telegrams.

According to an embodiment of the invention, said reduced part of said meter device identification is one byte of said meter device identification.

According to an alternative embodiment, said reduced part of said meter device identification is two bytes of said meter device identification.

An advantage of sending a reduced data telegram compared to data telegrams suggested by prior art may be that it is harder to break the encryption of the data telegram. As the information in the data telegrams are typically consumer specific and sensitive, data telegrams are typically encrypted in order to make them unreadable to third party receivers.

Redundant information makes it easier to break this encryption as it is often similar or the same for different meter devices. Therefore, it is an advantage of an embodiment of the invention that information that is non-specific to the meter device is limited in the data telegram. Another advantage of reducing redundant information in the data telegram is that a reduced and therefore shorter data telegram can be transmitted over a longer distance using the same transmission strength. This is because the package error rate (PER) increases with a longer data telegram, i.e. with more bits. The PER also increases with increasing bit error rate (BER), and the BER increases with longer transmission distance. Therefore, by reducing the length of the data telegram, the transmission distance may be increased without increasing the PER.

According to an embodiment of the invention, an identification computer device is adapted for receiving a data telegram from a meter device according to a radio protocol, said radio protocol comprising at least:
 a reduced part of said meter device identification and
 a data field, and
said identification computer device is adapted to perform a full meter device identification of said meter device from which said data telegram is received on the basis of a set of identification elements, said set of identification elements comprising at least:
 said reduced part of said meter device identification, and
 at least one information element obtained from a data source external to said meter device.

According to an embodiment of the invention, an identification computer device according to the above embodiment may comprise any combination of the features of the above embodiments of the radio protocol.

According to an embodiment of the invention, a meter device is adapted for operating in accordance with a radio protocol for communicating data between said meter device and a communication network, said meter device is being provided with a meter device identification for identifying said meter device,
wherein said radio protocol comprises at least:
 a reduced part of said meter device identification and
 a data field, and
wherein a full meter device identification of said meter device can be determined on the basis of a set of identification elements, said set of identification elements comprising at least:
 said reduced part of said meter device identification, and
 at least one information element obtained from a data source external to said meter device.

According to an embodiment of the invention, a meter device according to the above embodiment may comprise any combination of the features of the above embodiments of the radio protocol or identification computer means.

According to an embodiment of the invention, a method for communication between a meter device and a communication network in accordance with a radio protocol for communicating data between a meter device and a communication network said meter device is being provided with a meter device identification for identifying said meter device, wherein said radio protocol comprises:
 a reduced part of said meter device identification, and
 a data field,
wherein said method of communication comprises the steps of:
 transmitting a data telegram according to said protocol from said meter device,
 receiving said data telegram by said communication network, and
 identifying said meter device
wherein said step of identifying said meter device is performed on the basis of a set of identification elements, said set of identification elements comprising at least:
 said reduced part of said meter device identification, and
 at least one information element obtained from a data source external to said meter device.

According to an embodiment of the invention, a method for communication between a meter device and a communication network according to the above embodiment may comprise any combination of the features of the above embodiments of the radio protocol, identification computer means, or meter device.

An advantage of one embodiment of the invention is that the protocol uses a priori knowledge to minimize the communication needed between the meter device and the communication network. A communication with minimized amount of data being exchanged between the meter device and the communication network leads to a minimized power consumption, which in turn leads to a longer battery life. Such a priori knowledge may lead to much of the data otherwise transmitted from the meter device being redundant. Such redundant data may e.g. be a part of a meter device identification number, time stamp or timing information, format of the telegram, length of the telegram, etc.

The invention furthermore relates to a method for communication between a meter device and a communication network in accordance with a radio protocol for communicating data between a meter device and a communication network, said meter device being provided with a meter device identification for identifying said meter device, wherein said radio protocol comprises:
 a reduced part of said meter device identification and
 a data field,
wherein said method of communication comprises the steps of:
 transmitting a data telegram according to said protocol from said meter device,
 receiving said data telegram by said communication network, and
 identifying said meter device
wherein said step of identifying said meter device is performed on the basis of a set of identification elements, said set of identification elements comprising at least:
 said reduced part of said meter device identification, and
 at least one information element obtained from a data source external to said meter device.

According to an embodiment of the invention, said radio protocol furthermore comprises at least one information element, said set of identification elements furthermore comprises said at least one information element of the radio protocol, and said method furthermore comprises the step of
 obtaining said at least one information element comprising at least information relating to said at least one information element of the radio protocol from a data source external to said meter device.

According to an embodiment of the invention, said at least one information element of the radio protocol comprises at least a checksum, and wherein said method furthermore comprises the steps of
 establishing said checksum on the basis of at least:
 said meter device identification of the radio protocol, and
 said data field of the radio protocol.

According to an embodiment of the invention, said checksum is a Cyclic Redundancy Check (CRC) sum.

According to an embodiment of the invention, said method furthermore comprises the step of
obtaining said at least one information element comprising at least information about meter device identifications from a data source external to said meter device.

According to an embodiment of the invention, said method furthermore comprises the steps of
determining the validity of said data field on the basis of:
said checksum,
said data field, and
said information about meter device identifications.

According to an embodiment of the invention, said at least one information element of the radio protocol comprises at least timing data, wherein said information relating to said at least one information element of the radio protocol comprises at least information relating to an internal timing function of said meter device, and said method furthermore comprises the step of
establishing said timing data on the basis of said internal timing function of said meter device.

According to an embodiment of the invention, said at least one information element of the radio protocol comprises at least a synchronization word, said information relating to said at least one information element of the radio protocol comprises at least information relating to said synchronization word of said meter device, and said method furthermore comprises the step of
synchronizing communication between said meter device and said communication network by means of said synchronization word.

According to an embodiment of the invention, said method furthermore comprises the step of
obtaining at least one information element comprising at least information established at least partly on the basis of data fields of previous communication from a data source external to said meter device.

According to an embodiment of the invention, said set of identification elements furthermore comprises at least one communication information element, said method furthermore comprises the step of
establishing said at least one communication information element at least partly on the basis of said communication between said meter device and said communication network, and
said at least one information element obtained from a data source external to said meter device comprises at least information relating to said communication between said meter device and said communication network.

According to an embodiment of the invention, said communication network comprises an antenna receiving said communication, said at least one communication information element comprises at least a location, said method furthermore comprises the step of
establishing said location at least partly on the basis of the location of said antenna, and
said at least one information element relating to said communication between said meter device and said communication network comprises at least information about said location of said antenna.

According to an embodiment of the invention, said method furthermore comprises the step of
using a communication channel for communication between said meter device and said communication network,
said at least one communication information element comprises at least information about said communication channel, and said at least one information element relating to said communication between said meter device and said communication network comprises at least information about said communication channel.

According to an embodiment of the invention, said method furthermore comprises the steps of
determining a full meter device identification of said meter device on the basis of a set of identification elements, and
comparing said at least one information element obtained from a data source external to said meter device with at least a part of the rest of said set of identification elements.

According to an embodiment of the invention, said method furthermore comprises the steps of
receiving an information list from a database, and
obtaining at least one information element comprising at least said information list from a data source external to said meter device.

According to an embodiment of the invention, said reduced part of said meter device identification is one byte of said meter device identification.

According to an embodiment of the invention, said reduced part of said meter device identification is two bytes of said meter device identification.

It is noted that all of the above mentioned embodiments may be combined in any way to give new embodiments.

BRIEF DESCRIPTION OF THE DRAWING

An embodiment of the present invention will in the following be described with reference to the drawing in which.

DETAILED DESCRIPTION

Figure 1:
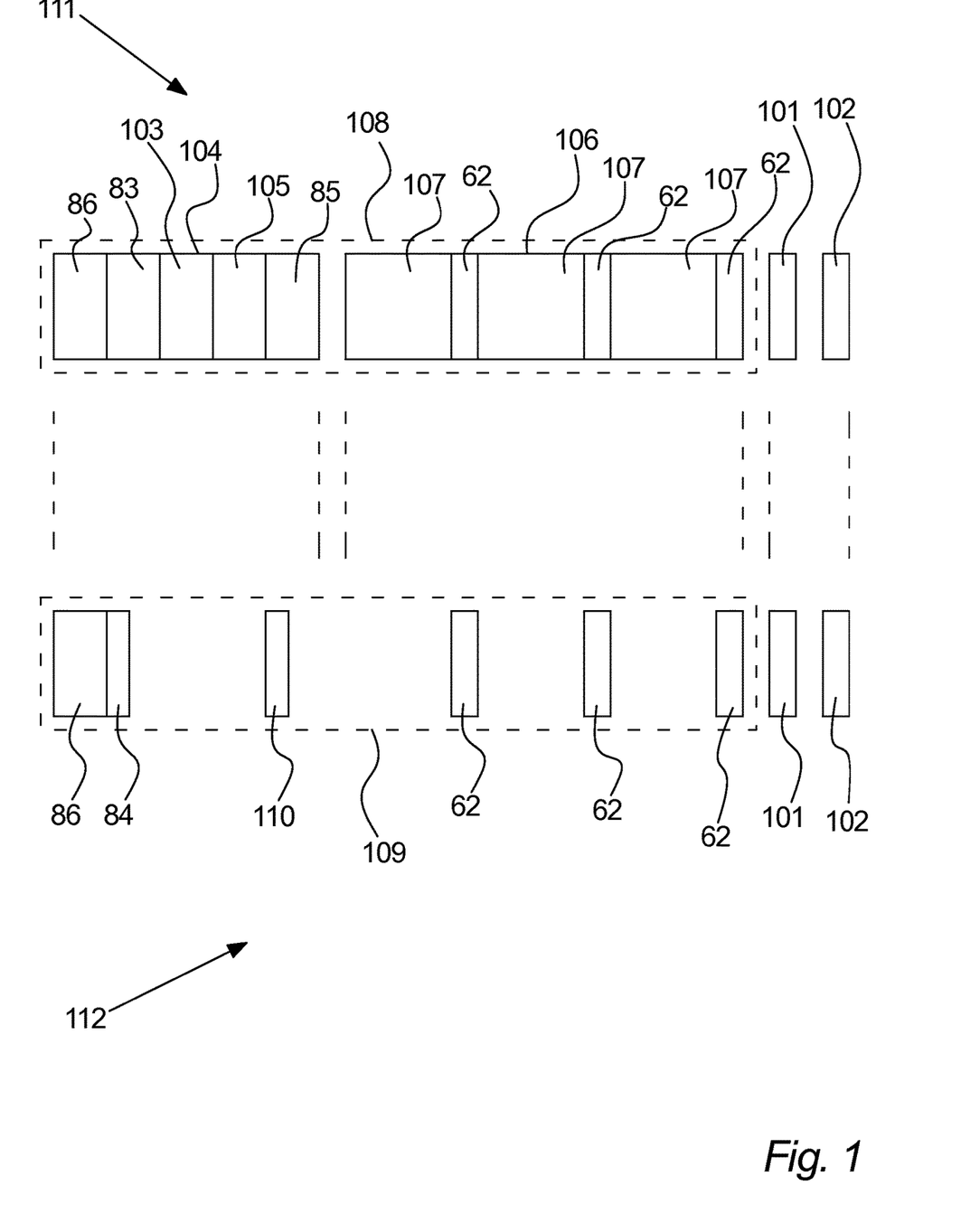
FIG. 1 illustrates a data telegram according to prior art and a data telegram according to an embodiment of the invention.

Referring to FIG. 1, a full data telegram 111 is shown with a reduced data telegram 112. The full data telegram 111 comprises a header 104, a complete data field 106, a first checksum 101, and a second checksum 102. The header comprises a synchronization word 86, a meter device identification 83, a length of the data telegram 103, timing data 85, and redundant information 105. The complete data field 106 comprises data information fields 107, and data fields 62. The data fields 62 comprises information such as information concerning the consumption or status of the meter device. According to an embodiment of the present invention, the reduced data telegram 112 comprises a synchronization word 86, a reduced part of meter device identification 84, a part of timing data 110, several data fields 62, a first checksum 101, and a second checksum 102. The reduced part of meter device identification 84 is a reduced part of the meter device identification 83, such as one byte of the meter device identification 83. The part of timing data 110 is a part of the timing data 85, such as one byte of the timing data 85. The first checksum 101 is calculated on the basis of the complete set of information 108. The second checksum 102 is calculated on the basis of the data telegram that is sent. I.e. if the full data telegram 111 is sent, the first checksum 101 and the second checksum 102 are equal. According to EP 2088706, the data information fields may be omitted. Then the first checksum 101 is calculated on the basis of a complete set of information 108 comprising the header 104 and complete data field 106 of the full data telegram 111, including the data information fields 107. By calculating the first checksum 101 on the basis of the complete set of information 108, it is possible to check the matching of assumed information paired with the reduced set of information 109 which is performed by the receiver of the reduced data telegram 112. By calculating the second checksum 102 on the basis of the reduced set of information 109, i.e. on the reduced data telegram 112 which is actually sent, it is possible to verify if any errors in the data telegram 112 has occurred.

Figure 2:
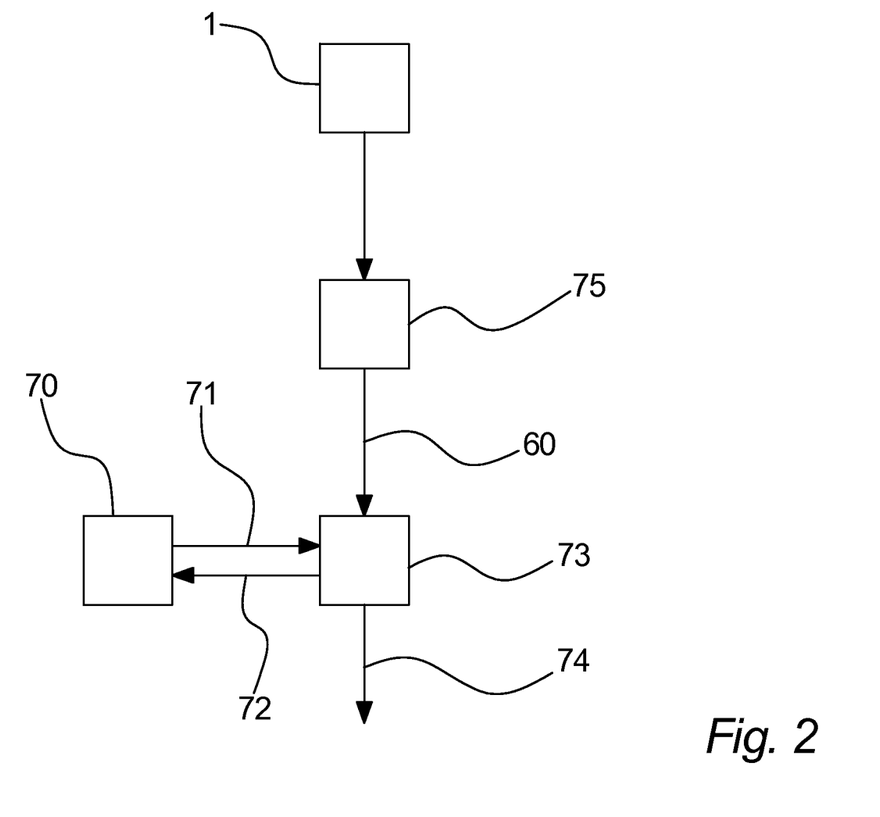
FIG. 2 illustrates the communication between the meter device, the communication network, the identification computer means, and the database according to an embodiment of the invention.
Figure 3:
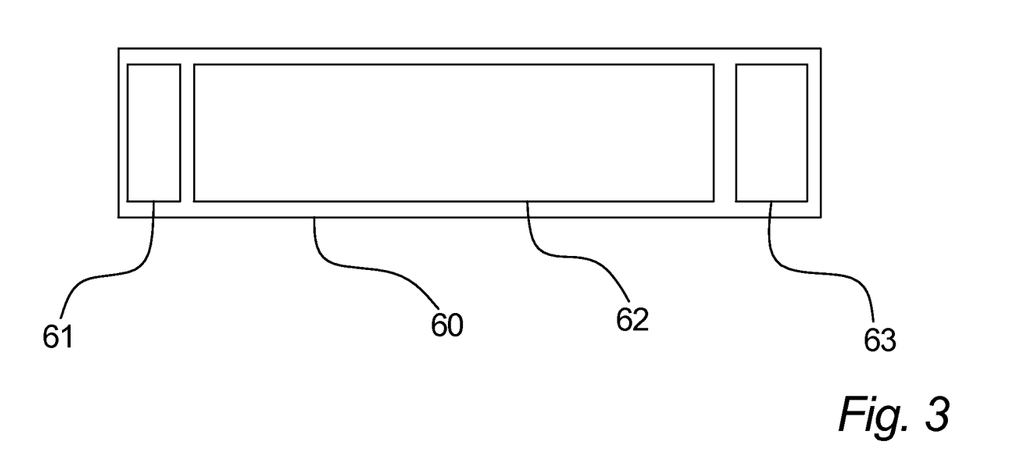
FIG. 3 illustrates an example of a data telegram according to an embodiment of the invention.

Referring to FIG. 2, a simple illustration of the identification process according to an embodiment of the invention is shown. On FIG. 2, a meter device 1, identification computer means 73, and a database 70 are seen. The identification computer means 73 may receive information from the meter device 1 in the form of a data telegram 60, an example of which is shown on FIG. 3. The data telegram 60 is received by a communication network 75. The identification computer means 73 may receive data telegrams from multiple other meter devices not shown in FIG. 2. The example of a data telegram 60 shown on FIG. 3 according to the radio protocol according to the present invention comprises a reduced part of an identification number 61, a data field 62, and a checksum 63. The database 70 in FIG. 2 contains meter device identifications, preferably in the form of meter device identification numbers, and other information elements. Such other information elements may be one or more of e.g. meter device synchronization words, meter device timing data, meter device radio channel, or other information usable for identification of the sender meter device 1. Since the data telegram 63 contains only a reduced part of an identification number 61 and not a full identification number 74, the full identification number 74 must be constructed. According to this preferred embodiment, the meter device 1 transmits a data telegram 60 to the identification computer means 73. When the identification computer means 73 receives the data telegram 60, containing a reduced part of the identification number 61 and other information elements, it sends a request 72 for a list of identification and information elements 71 to the database 70. This may comprise all identification numbers in the database 70, or it may be for a limited set of identification numbers, the limited set being determined on the basis of the part of an identification number 61 and/or information elements contained in the data telegram 60. In some embodiments, the database 70 contains only data for a limited number of meter devices, e.g. when the database 70 is locally placed e.g. at the antenna. The list of identification elements 71 may contain, in addition to identification numbers, information elements. On the basis of the reduced part of the identification number 61 contained in the data telegram 60, the list of identification and information elements 71 received from the database 70, and possibly one or more information elements deduced from the communication between the meter device 1 and the communication network 75, the identification computer means 73 determines the full identification number 74 of the sender meter 1, from which the data telegram 60 has been transmitted. Such deduced identification elements may be one or more of e.g. a location of the meter device 1 and/or the antenna of the communication network 75, a communication channel, signal strength, or other identification elements or information deducible from the communication between the meter device 1 and the communication network 75 and which may be different for different meter devices. An important teaching of FIG. 2 is that a full identification is performed partly on the basis of at least one identification element received from the meter, here being a part of an identification number 61, and partly on the basis of a list of identification numbers requested from a database.

Figure 4:
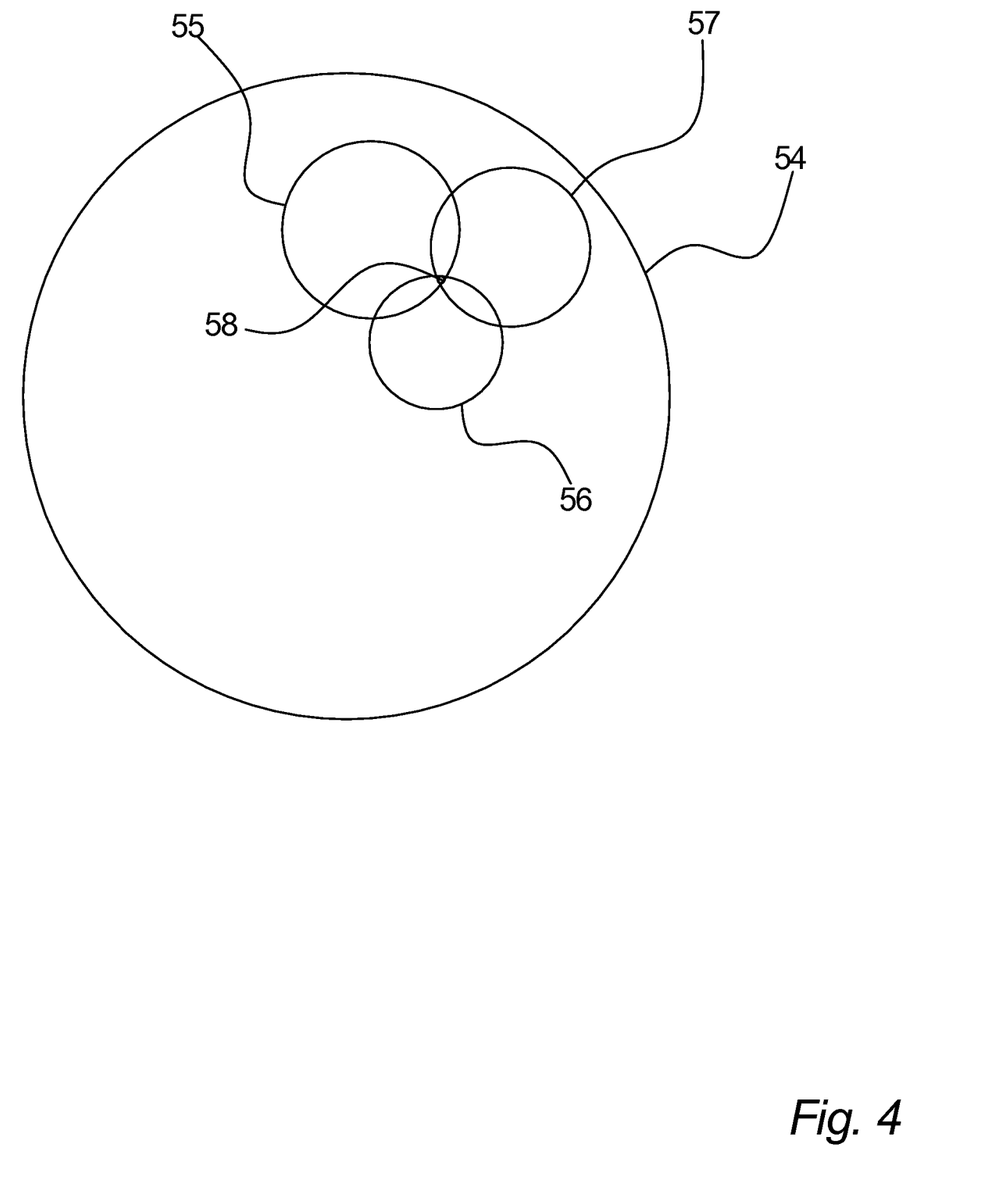
FIG. 4 illustrates the identification process according to an embodiment of the invention.

Referring to FIG. 4, an embodiment of the invention is illustrated. All identification numbers 54 of the database 70 are shown as a circle illustrating the set of identification numbers 54 contained in the database 70. Using different information elements, which alone are not sufficient to make a complete identification, the identification is carried out. Each information element reduces the number of identification numbers in the database 70 that are consistent with the given information element. As more information elements are taken into account, the number of possible sender meter devices reduces leaving only a single possible identification number 58 after a sufficient number of information elements have been applied. In an example embodiment, the location of the receiving antenna of the communication network 75 is combined with database information about location of the individual meter devices, giving a limited number of identification numbers 55 matching this location information. There are also a limited number of identification numbers 56 in the database 70 that has the correct part of an identification number 61. Finally, there are a limited number of identification numbers 57 in the database that combined with the data field 62 of the data telegram 60 gives the correct checksum 63. Combining two of the information elements will limit the number of possible identification numbers even further, but according to this example embodiment this will not be enough to reduce the possible identification numbers to only one. This is illustrated as the intersection of any two circles representing the sets of identification numbers 55, 56, and 57 on FIG. 4. According to this example embodiment, it is necessary to combine three identification elements in order to achieve a full identification, i.e. to have one and only one identification number 58 matching all of the used information elements. In other embodiments of the invention, it may be sufficient to use only one or two information elements, whereas in yet other embodiments of the invention, it may be necessary to use more than three information elements, such as four, five, six or more information elements. In some embodiments, it may be advantageous to perform the identification steps mentioned above in a certain order in order to minimize the need of processing power and in order to give the fastest identification. I.e. it may be advantageous to use the information elements in a certain order. This could mean that e.g. location data is the first information element that is used. Also, information about communication channel may be used relatively early, e.g. in the second step. On the other hand, checksum data may be used as the last information element, as it requires some data processing power to calculate possible checksum values, especially if the number of possible meter device identifications is high.

Figure 5:
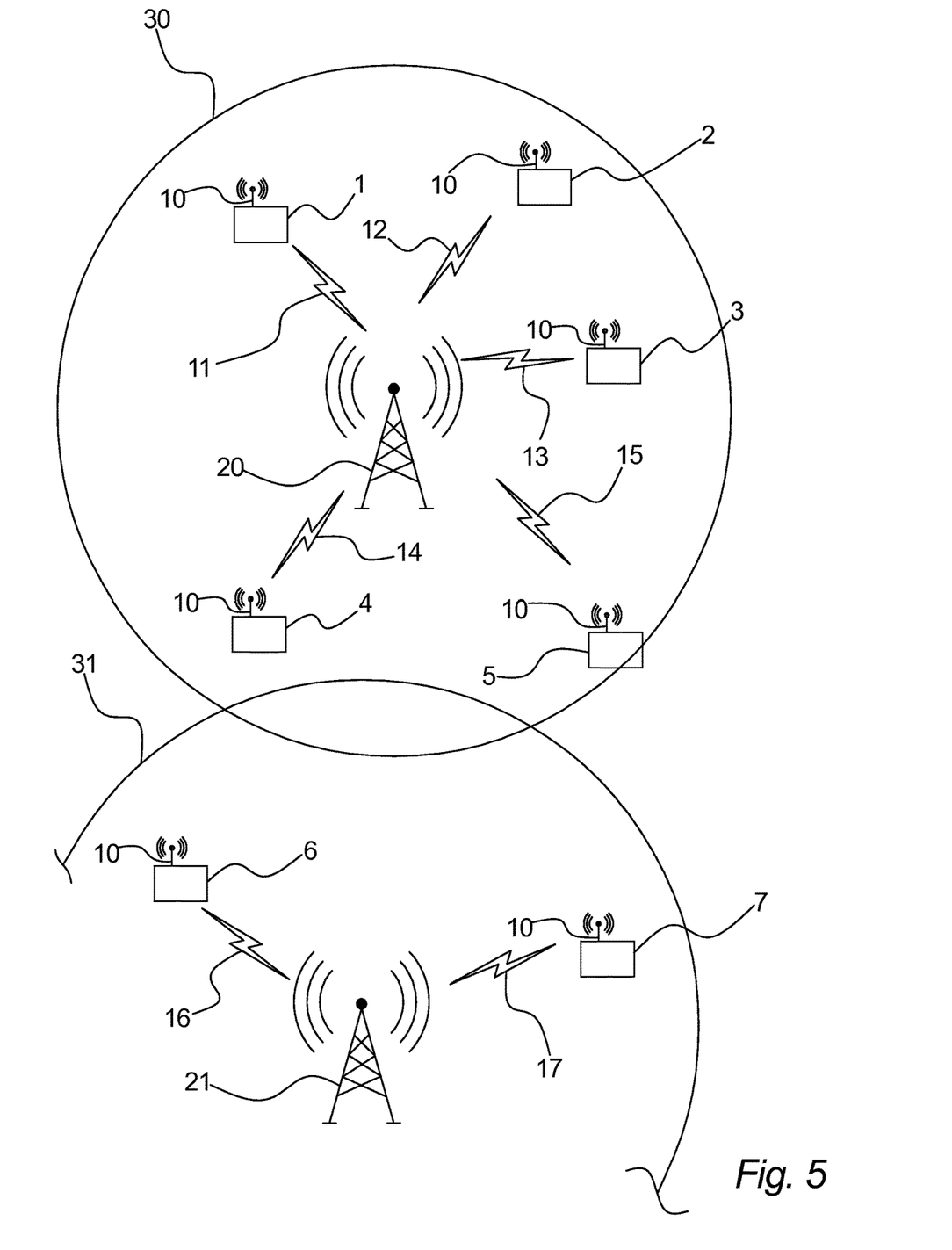
FIG. 5 illustrates the communication between multiple meter devices and two stationary antennas according to an embodiment of the invention.

Referring to FIG. 5, an example embodiment of the invention is illustrated. In this example embodiment, a number of meter devices 1-7 and stationary antennas 20 and 21 are illustrated. The range 30 of the stationary antenna 20 is illustrated by a circle 30, as is the range 31 of antenna 21. In real life, the range will be influenced by a number of factors, such as height difference of ground level, buildings, reflections etc. For illustrative purposes, a simplified model is presented showing a circular range. Each of the meter devices 1-7 is provided with a meter device antenna 10. The meter devices 1-7 will each transmit a data telegram 11-17 comprising a reduced part of an identification number 61, in this example embodiment the last byte of their identification number. The data telegrams 11-17 furthermore comprise at least a data field corresponding to the consumption measured by each of the meter devices 1-7, and a checksum. As illustrated in FIG. 5, meter devices 1-5 are within the range 30 of stationary antenna 20, but out of range 31 of antenna 21, whereas meter devices 6-7 are out of range 30 of stationery antenna 20 but in range 31 of antenna 21. This means that the data telegrams 11-15 transmitted by meter devices 1-5 will be received by antenna 20, while data telegrams 16-17 transmitted by meter devices 6-7 will be received by antenna 21. The received data telegrams 11-17 then sent from the antennas 20, 21 to identification computer means 73 for identification. Each of the meter devices 1-7 is provided with a unique meter device identification number, as listed in table 1. The identification numbers according to this example embodiment consists of three bytes, i.e. three numbers between 0 and 255. When each of the meter devices 1-5 transmit a data telegram 11-15 to the stationary antenna 20 according to this embodiment of the invention, they will only transmit the last byte of their identification number. This is according to table 1 sufficient to uniquely identify data telegrams 13-15 and 17 coming from meter devices 3-5 and 7, as the last byte of the identification numbers of these meter devices are unique, i.e. different from all the other last bytes. According to table 1, meter devices 1, 2, and 6 have a common identification number where the last byte is 8. Therefore, additional information is needed in order to identify the meter device from which each of the received data telegrams 11, 12, and 16 has been sent. The identification numbers of the meter devices 1-7 are in this example embodiment listed in a database 70. In this embodiment, the database also comprises information for each of the meter devices 1-7 from which antenna 20 or 21 is able to receive a transmission. Such location knowledge may e.g. be obtained when installing the meter devices 1-7, or from previous communications. In other embodiments, the correlation between meter devices 1-7 and antennas 20-21 may be calculated from a position of meter devices 1-7 and antennas 20-21, by means of e.g. computer software. Such software may in some embodiments take further information into account, such as information about terrain, buildings, weather, earlier measurements etc. Also, in some embodiments, it is possible that a data telegram is received by more than one antenna, and that such information may be used to provide a more exact location of the sender meter device. In this simple example embodiment, however, only antenna 20 is listed for meter devices 1-5 in the database, whereas only antenna 21 is listed for meter devices 6-7.

By comparing information about which of the antennas 20, 21 that has received a data telegram with information from the database, it is possible to limit the number of possible sender meter devices. According to this example embodiment, it may with such knowledge be determined that the meter device, for which the value of the last byte 61 is 8 and which is communicating with antenna 21, must be meter 6.

However, the meter devices, which have an identification number last byte 61 being 8 and which are communicating with antenna 20, may be either of meter devices 1 or 2. So, by combining the location knowledge with received identification byte, it is in this example possible to uniquely identify meter devices 3-7, whereas identification of meter devices 1-2 is not possible without additional information. Additional information may in this example embodiment be a checksum, such as a Cyclic Redundancy Check (CRC) sum, which is transmitted as a part of the data telegram 60. The transmitted checksum may be compared with possible checksums calculated by identification computer means 73 from data field 62 of the data telegram 60 and the possible identification numbers of meter devices 1-2. By comparing the calculated checksums with the transmitted checksum, it is possible to identify the correct combination of data filed 62 and identification number if possible meter devices 1-2, i.e. to identify the meter device 1 or 2 which has sent the data telegram 60. Furthermore, if the checksum may still be used to check the validity of the data telegram 60 or the data field 62. If none of the possible identification numbers gives the correct checksum, this indicates a corrupted data telegram 60 or data field 62. To sum up, in this example, this means that data telegrams 11-15 received by antenna 20, may only correspond to meter devices 1-5, as these are known to be the only meter devices able to transmit to antenna 20. Furthermore, each the last byte of meter device identification numbers from meter devices 3-5 is unique thereby identifying the sender meter device 3-5 of these data telegrams 13-15. Finally, the sender meter device 1 or 2 of the data telegrams 11-12 is identified by calculating the checksum from the possible combinations of possible identification number and the data field 62 of each data telegram 11-12, and comparing with the checksum of data telegrams 11-12. Only the combinations of data fields and identification numbers giving a checksum corresponding to the checksum received in the same data telegram 11 or 12 as the data field 62, from which it is calculated, will be the correct combinations, thereby identifying the sender meter devices 1 or 2. In some embodiments it may be advantageous to use consumption data, such as the consumption data listed in table 1. For example, if data telegram 12 from meter device 2 is received by the communication network, the consumption is 16 in a certain unit as listed in table 1. This could e.g. be 16 cubic meters of water consumption. It may in an example embodiment then be so that it is known that the previous measured consumption of meter device 1 was e.g. 19, the previous measured consumption of meter device 2 was 12, and previous measured consumption of meter device 6 was 49. Then combining last byte 8 of identification number and knowledge about previous consumption of corresponding meter devices 1, 2, and 6 with the measured value 16 gives the conclusion that the data telegram must come from meter device 2 as the consumption may not reverse, i.e. it is cumulative. The data telegram may in some embodiments contain more data fields, where some may be cumulative and some may not, e.g. a cumulative consumption, and an instantaneous flow rate.

TABLE 1

| Meter device | ID | Consumption |
|---|---|---|
| 1 | 111.245.8 | 23 |
| 2 | 89.3.8 | 16 |
| 3 | 209.49.102 | 3 |
| 4 | 29.102.221 | 89 |
| 5 | 34.190.90 | 0 |
| 6 | 67.44.8 | 62 |
| 7 | 72.234.66 | 5 |

Figure 6:
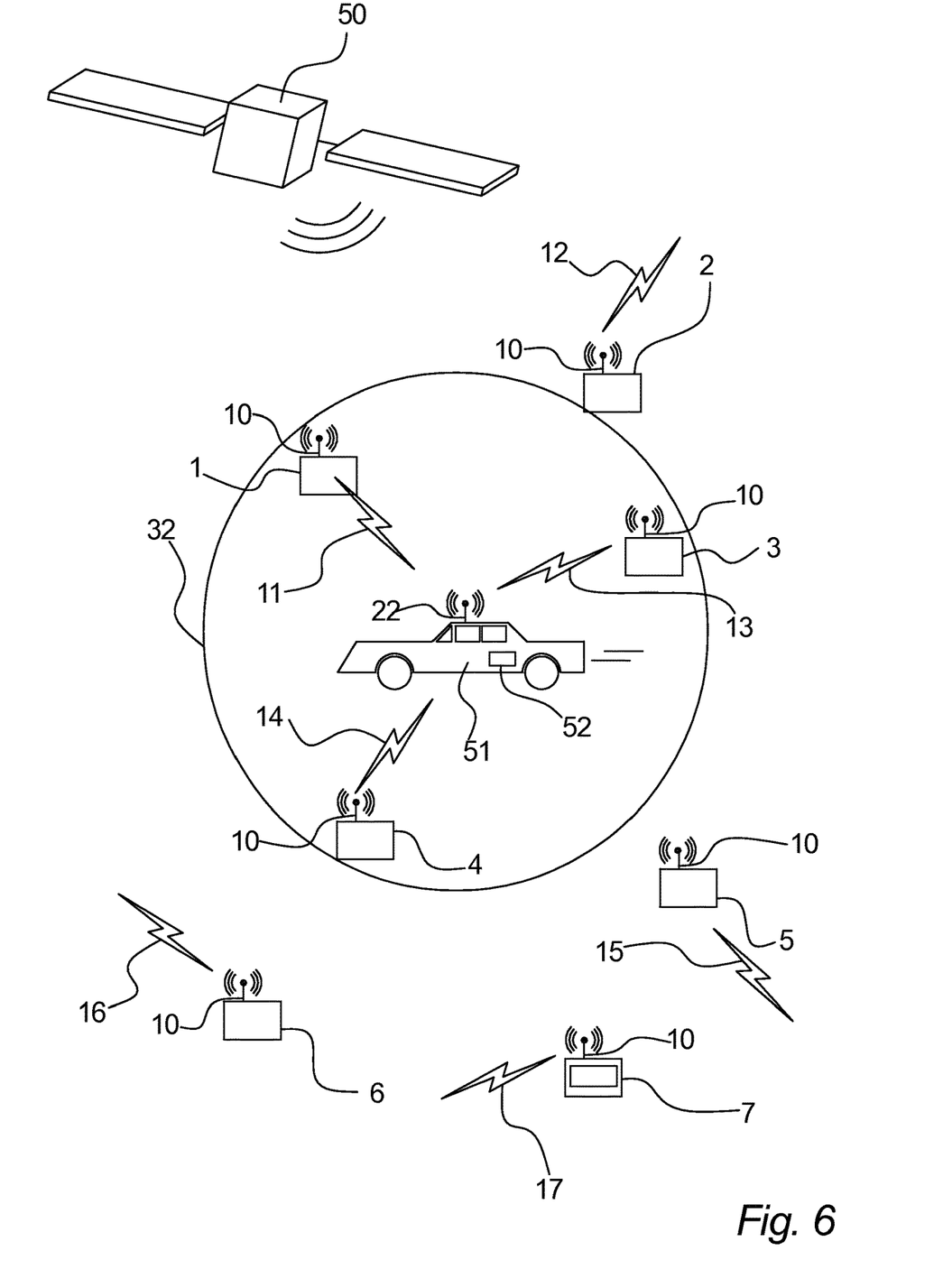
FIG. 6 illustrates the communication between multiple meter devices and a mobile antenna according to an embodiment of the invention.

Referring to FIG. 6, another example embodiment of the invention is shown. In this example, a number of meter devices 1-7 each with their own antenna 10 are transmitting data telegrams 11-17. A moving vehicle 51 is provided with an antenna 22 for receiving data telegrams 11-15 from meter devices 1-5 within range 32 and a positioning unit 52 for receiving a positioning signal from one or more positioning satellites 50 and determining a position of the vehicle 51 on the basis thereof. Since the antenna 22 is placed on a vehicle 51 which is mobile, it functions as a mobile antenna 22. The receiving range 32 of the mobile antenna 22 is illustrated by a circle.

As for FIG. 6, this circle is a simplification and is provided only for illustrative purposes. In this example embodiment and at the exact time corresponding to the position of vehicle 51 as shown in FIG. 6, only meter devices 1, 3, and 4 are within range of mobile antenna 22, and thus only data telegrams 11, 13, and 14 may be received. Each of data telegrams 11, 13, and 14 are stored together with the position of the vehicle 51 corresponding to the moment where the data telegrams 11-15 are received. In this example, the position is provided by receiving a positioning signal from at least one satellite 50 by positioning unit 52. This could e.g. be a GPS-signal or a signal from other positioning systems such as GLONASS, Compass navigation system, Galileo positioning system, or other systems. In other embodiments, the location of the vehicle 51 may also be determined on the basis of mobile network signals or Wi-Fi signals or other radio signals, whereas in yet other embodiments, it may be obtained by manual entry of a position, such as e.g. a street address by the vehicle operator, or by other means. The identification of the meter device corresponding to the received data telegrams 11, 13, and 14 may be carried out similar to the embodiment illustrated by FIG. 5. However, the vehicle 51 may be provided with an antenna 22 with a shorter range than a stationary antenna 20, 21, as can be seen from antenna range 32 being shorter than antenna range 31 of FIG. 5. Therefore, the number of meter devices 1, 3-4 within the range 32 of the mobile antenna 22 is likely to be smaller than the number of meter devices 1-5 within the range 30 of a stationary antenna 20. In general, a mobile antenna 22 on a vehicle 51 may cover the same area as a stationary antenna 20, even though the mobile antenna 22 has a shorter range 32 than the range 30 of a stationary antenna 20. Furthermore, an antenna with a short range will be able to communicate with a smaller number of meter devices, thereby reducing the need of alternative identification elements.

In these examples, one aspect is to identify possible transmitting meter devices by using the location of the receiving antenna, being a stationary 20 or 21 or a mobile antenna 22. A typical range of such an antenna gives, in the simplest form, a circular area 30-32 in which the transmitting meter device will be located, as it is illustrated in FIGS. 5 and 6. However, many other factors may be taken into consideration to determine an area in which the transmitting meter device is located and thereby identifying possible transmitting meter devices. Such factors may be one or more of e.g. height difference of ground level, buildings, reflections, weather, signal strength and type and location of meter device and meter device antenna 10. Also, historical data about all above mentioned parameters and other factors may be taken into consideration.

In the above listed example embodiments of the invention, a meter device communicates with a communication network by radio frequency wireless communication. However, in other embodiments, such communication may be by a wired communication network, by other forms of wireless transmission, or even by communication through the electricity grid.

In the above example embodiments, a reduced part of an identification number, a location of the receiving antenna, and a checksum are used to identify the transmitting meter device. However, in some embodiments of the invention, only some of these elements are used, e.g. a part of an identification number and a checksum, or a part of an identification number and a location, or a location and a checksum. Also, in some embodiments other elements may be taken into consideration. Such elements could e.g. be one or more of a synchronization word, a radio channel, a reduced part of a timing information or other information elements.

In one example embodiment of the invention, a part of the identification of the sender meter device 1 of a received data telegram 11 may be comprise comparing information about a synchronization word 86. Such a synchronization word 86 is usually incorporated in the beginning of a data telegram 11. The purpose of the synchronization word 86 is to synchronize communication between the sending meter device 1 and the communication network 75. When the meter device 1 is sending the data telegram 11, a carrier signal may in an embodiment be modulated by the communication signal. The communication network may, however, not know the exact timing of the communication signal, i.e. it may not know when a bit or a byte starts. Therefore, a sequence of bits called the synchronization word 86, which does not carry any information, is sent so that the communication network 75 may adjust to the signal. More specifically, the synchronization word 86 enables the communication network 75 to work out the temporal location of the starting point of a bit and the starting point of a byte. In one embodiment of the invention, not all meter devices have the same synchronization word. According to this embodiment of the invention, the database 75 comprises information about which meter devices that uses which synchronization words 86. When a data telegram 11 is received, at least part of the synchronization word 86 may be compared with synchronization words 86 for possible meter device identification numbers. This will limit the number of possible identification numbers.

In one embodiment of the invention, information about the radio channel used to transmit the data telegram 11 may be used in identifying the sender meter device 1. In an embodiment, not all meter devices are sending at the same frequency or radio channel. Information about the frequency or radio channel used by each of the meter devices may in this embodiment be stored in the database 75. When the data telegram 11 is received by the communication network 75, the frequency or radio channel by which it was sent may then be compared with database information comprising possible identification numbers and information about frequency or radio channels corresponding to each identification number. Since the meter devices in this embodiment of the invention may use different frequencies or radio channels, comparing the frequency or radio channel used for transmission with database information reduces the numbers of possible identification numbers.

In one example embodiment, timing information is taken into consideration when identifying the sender meter device of a data telegram. Such timing information may come from data in the data telegram or from information obtained during the transmission of data from the meter device 1 to the communication network 75. A meter device 1 may have an internal clock or timing function, which typically is started after or during production of the meter device. The database 70 may in an embodiment comprise information about the starting points of each of the internal clock of the meter devices. The data telegram 11 of a meter device 1 may in an embodiment comprise a time stamp or a reduced part of a time stamp, where the time stamp corresponding to the internal clock of the meter device. By comparing the time stamp or the reduced part of the time stamp received in the data telegram 11, with the timing information in the database 70, the number of possible identification numbers may be reduced.

In another example embodiment, the timing information may relate to the temporal length of the data telegrams or information about how often these data telegrams are transmitted from the meter device. Such a sending frequency may e.g. be one data telegram every 1, 5, 15, 30, or 60 seconds or every 2, 5, 10, or 30 minutes, or even at other time intervals such as hours, days, or months. In an embodiment where the data telegrams are received by a mobile antenna 22, it is important that the sending frequency is high enough for the vehicle to receive the data telegram during bypass.

When a meter device 1 is installed, there will according to an embodiment of the invention, be a need to follow certain procedures. This could e.g. be that the meter device 1 is linked to a certain antenna or that other data about the meter device 1 is determined and transferred to the relevant database 70. In one embodiment the meter device 1 comprises a function to send a full data telegram 60 during installation, e.g. by pressing a button on the meter device 1. Hereby, the full identification number 74, full time data and other relevant information, such as information about synchronization word, radio channel etc., is received by an antenna and stored in the database 70. If the database 70 or part of it is lost or damaged, it may have to be reconstructed in order to provide identification elements for the identification. This may be done in various ways. In an example embodiment, this can be done by reinstallation as described above, i.e. by manually visiting the meter devices and acquiring the lost information, e.g. identification number, location, timing information, synchronization word, radio channel, etc. In another example embodiment of the invention, the meter devices may be able to receive a request from the communication network 75 and as a result send a data telegram containing enough information to perform a complete identification and/or reconstruction of the database information. Such information may be e.g. a complete identification number, synchronization word, radio channel, complete timing information, etc. Another way of reconstructing the database 70 is by requesting a list of identification numbers from the manufacturer(s) of the meter devices. Such a list of identification numbers may preferably contain further identification information, such as timing information or starting point of the internal clock, synchronization words, radio channels, etc.

It may in one embodiment be necessary to perform two-way communication between the meter device 1 and the communication network 75 if the synchronization between the internal clock of the meter device 1 and the clock used in the identification computer means 73 is lost.

Figure 7:
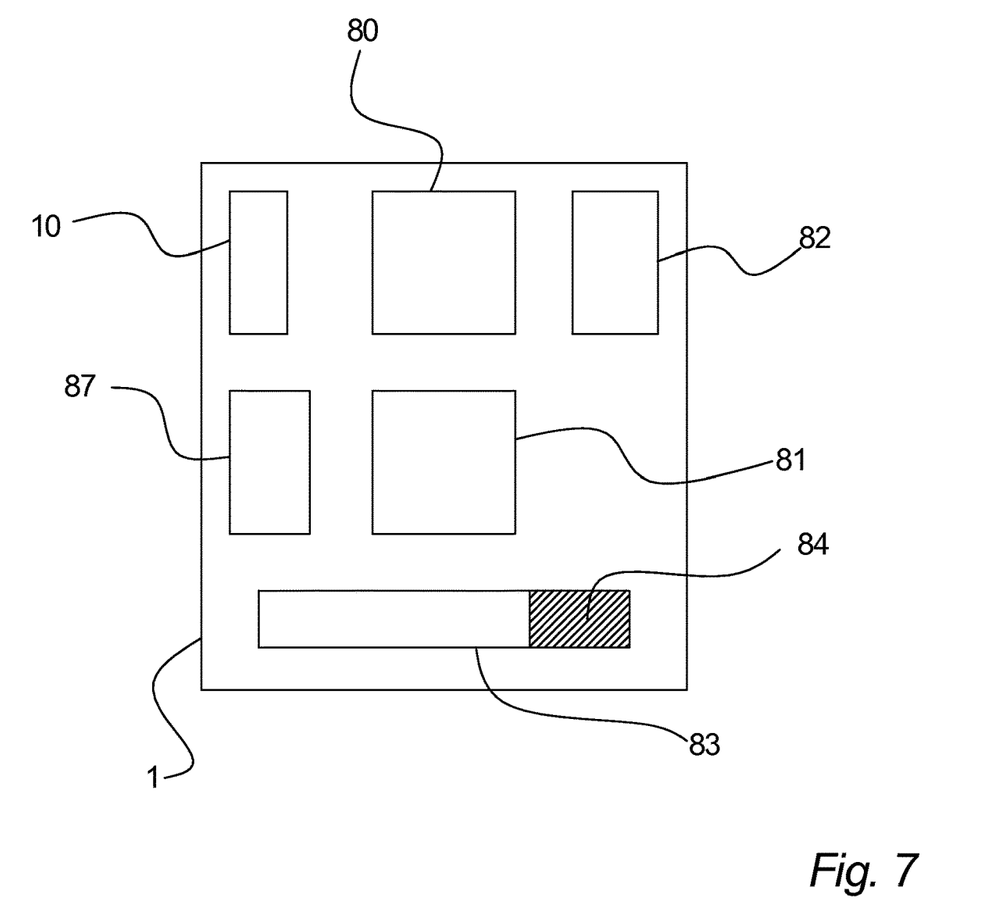
FIG. 7 illustrates a meter device according to an embodiment of the invention.

Referring to FIG. 7, an example embodiment of the invention is shown. An example of a meter device 1 is shown. The meter device 1 comprises a meter device antenna 10, a meter device processor 80, a meter device storage 81, and meter device measuring means 82 for measuring a physical quantity, such as e.g. water, gas, heat, electricity, etc. Finally, the meter device 1 comprises a meter device identification 83, which comprises a reduced part of the meter device identification 84, and an internal timing function 87. The meter device antenna 10 may transmit a data telegram 11 according to information such as a reduced part of the meter device identification 84 or timing data stored in meter device storage 81 and according to information from the meter device measuring means 82.

Figure 8:
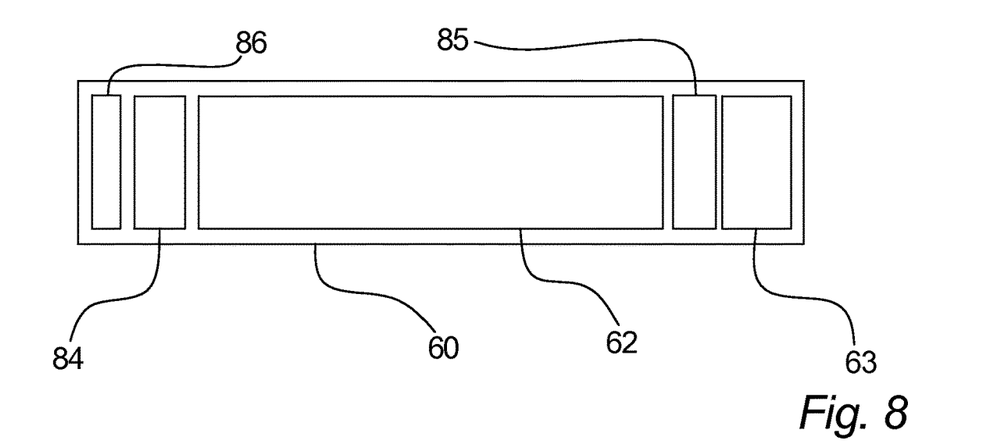
FIG. 8 illustrates an example of a data telegram according to an embodiment of the invention.

Referring to FIG. 8, a data telegram 60 according to an embodiment of the invention is illustrated. According to the embodiment, the data telegram 60 comprises a synchronization word 86 for synchronizing communication between a meter device 1 and a communication network 75, a reduced part of a meter device identification 84, a data field 62, timing data 85, and a checksum 63. The timing data 85 relates to the internal timing function 87 of the meter device 1. In one embodiment of the invention, the internal timing function 87 counts the time from the fabrication of the meter device 1. The timing data 85 may then be e.g. a reduced part of a time stamp at the moment where the data telegram 60 is transmitted, such as the last bit of the time stamp. It may, however, also be a full time stamp or other timing data 85 relating to the internal timing function 87.

REFERENCE NUMERALS

1. Meter device 1
2. Meter device 2
3. Meter device 3
4. Meter device 4
5. Meter device 5
6. Meter device 6
7. Meter device 7
10. Meter device antenna
11. Data telegram from meter device 1
12. Data telegram from meter device 2
13. Data telegram from meter device 3
14. Data telegram from meter device 4
15. Data telegram from meter device 5
16. Data telegram from meter device 6
17. Data telegram from meter device 7
20. Stationary antenna
21. Stationary antenna
22. Mobile antenna
30. Range of antenna 20
31. Range of antenna 21
32. Range of antenna 22
51. Vehicle
52. Positioning unit
54. All identification numbers of the database
55. Identification numbers matching location information
56. Identification numbers matching part of ID number
57. Identification numbers matching a checksum
58. Identification number matching all criteria
60. Data telegram
61. Reduced part of identification number 62. Data field
63. Checksum
70. Database
71. List of identification elements
72. Request for identification numbers
73. Identification computer means
74. Full identification number
75. Communication network
80. Meter device processor
81. Meter device storage
82. Meter device measuring means
83. Meter device identification
84. Reduced part of meter device identification
85. Timing data
86. Synchronization word
87. Internal timing function
101. First checksum
102. Second checksum
103. Length of data telegram
104. Header
105. Redundant information
106. Complete data field
107. Data information field
108. Complete set of information
109. Reduced set of information
110. Part of timing data
111. Full data telegram
112. Reduced data telegram

The invention claimed is:

1. A method for communication between a meter device and a communication network in accordance with a radio protocol, said meter device being provided with a meter device identification for identifying said meter device, said radio protocol including:
   a reduced part of said meter device identification, the reduced part being obtained by excluding a part of said meter device identification,
   a data field,
   a checksum based on at least said meter device identification and said data field, and
   an information element obtained from a data source external to said meter device, and having a meter devices information data set including meter device identifications for a set of meter devices, and
   said method for communication comprising steps of:
   transmitting a data telegram, said data telegram including said reduced part of said meter device identification, said data field, and said checksum, according to said radio protocol from said meter device,
   receiving said data telegram from said meter device, and
   identifying said meter device by correlating said reduced part of said meter device identification, said checksum, and said meter devices information data set.

2. The method for communication according to claim 1, wherein said information element at least includes timing data.

3. The method for communication according to claim 1, wherein said information element at least includes a synchronization word.

4. The method for communication according to claim 1, wherein said information element includes a data field of previous communication.

5. The method for communication according to claim 1, wherein said information element includes a communication information element.

6. The method for communication according to claim 5, wherein said communication information element comprises at least a location of said antenna receiving said data telegram.

7. The method for communication according to claim 5, wherein said communication information element comprises at least information about a communication channel for communication between said meter device and said communication network.

8. A radio protocol for communicating data between a meter device and a communication network, said meter device being provided with a unique meter device identification for identifying said meter device, said radio protocol comprising:
   a reduced part of said meter device identification, the reduced part being obtained by excluding a part of said meter device identification;
   a data field;
   a checksum based on at least said meter device identification and said data field; and
   an information element obtained from a data source external to said meter device,
   wherein said reduced part of said meter device identification is configured to be used in a full meter device identification of said meter device together with said information element and said checksum,
   wherein a data source external to said meter device has a meter devices information data set including meter device identifications for a set of meter devices, and
   wherein said radio protocol is adapted to permit identifying said meter device from said set of meter devices by correlating said meter devices information data set, said reduced part of said meter device identification, and said checksum.

9. An identification computer device adapted for receiving a data telegram from a meter device according to a radio protocol, said meter device being provided with a unique meter device identification for identifying said meter device, and said radio protocol comprising at least:
   a reduced part of said meter device identification, the reduced part being obtained by excluding a part of said meter device identification,
   wherein said identification computer device is further adapted to perform a full meter device identification of said meter device based, at least, on:
   said reduced part of said meter device identification received as part of said data telegram,
   at least one information element obtained from a data source external to said meter device, and
   a checksum received as part of the data telegram,
   wherein said data source external to said meter device has a meter devices information data set including meter device identifications for a set of meter devices, and
   wherein said identification computer device is further adapted to identify said meter device from said set of meter devices by correlating said meter devices information data set, said reduced part of said meter device identification, and said checksum.

10. A meter device adapted for operating in accordance with a radio protocol for communicating data between said meter device and a communication network, said meter device being provided with a meter device identification for identifying said meter device, said radio protocol comprising:
   a reduced part of said meter device identification, the reduced part being obtained by excluding a part of said meter device identification;

a data field;

a checksum based on at least said meter device identification and said data field; and an information element obtained from a data source external to said meter device, wherein said reduced part of said meter device identification is configured to be used in a full meter device identification of said meter device together with said information element and said checksum, wherein said data source external to said meter device has a meter devices information data set including meter device identifications for a set of meter devices, and wherein said meter device is further adapted to being identified from said set of meter devices by correlating said meter devices information data set, said reduced part of said meter device identification, and said checksum.

11. The method for communication according to claim 1, wherein said step of transmitting said data telegram is powered via a battery of said meter device, said battery having a life period.

12. The method according to claim 1, wherein the step of identifying comprises calculating checksums based on the data field and meter device identifications of the meter devices information data set, and comparing the calculated checksums to the checksum of the data telegram to identify a match.

13. The method according to claim 1, wherein the radio protocol further comprises a second checksum based on at least said reduced part of said meter device identification and said data field, and wherein the second checksum is included in the data telegram.

* * * * *